United States Patent
Yasuda

(10) Patent No.: US 11,412,725 B2
(45) Date of Patent: Aug. 16, 2022

(54) FISHING REEL, BRAKING FORCE CONTROL SYSTEM AND BRAKING FORCE SETTING DEVICE

(71) Applicant: GLOBERIDE, Inc., Tokyo (JP)

(72) Inventor: Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/181,633

(22) Filed: Feb. 22, 2021

(65) Prior Publication Data

US 2022/0061288 A1    Mar. 3, 2022

(30) Foreign Application Priority Data

Aug. 27, 2020  (JP) .............................. JP2020-143233

(51) Int. Cl.
*A01K 89/01*    (2006.01)
*A01K 89/033*   (2006.01)

(52) U.S. Cl.
CPC .................................. *A01K 89/033* (2013.01)

(58) Field of Classification Search
CPC .......................... A01K 89/0155; A01K 89/033
See application file for complete search history.

(56) References Cited

U.S. PATENT DOCUMENTS

| 2006/0169813 A1* | 8/2006 | Nakagawa ....... A01K 89/01555 242/288 |
| 2007/0108330 A1 | 5/2007 | Ikuta et al. |
| 2010/0006686 A1* | 1/2010 | Yusa ................ A01K 89/01555 242/227 |
| 2020/0165109 A1* | 5/2020 | Niitsuma ......... A01K 89/01555 |

FOREIGN PATENT DOCUMENTS

| EP | 1435199 A1 * | 7/2004 | ....... A01K 89/01555 |
| EP | 1785030 B1 * | 5/2008 | ....... A01K 89/01555 |
| JP | 2007-135417 | 6/2007 | |

OTHER PUBLICATIONS

European Search Report for related European Application No. 21158163.2; action dated Jul. 26, 2021; (10 pages).

* cited by examiner

*Primary Examiner* — Emmanuel M Marcelo
(74) *Attorney, Agent, or Firm* — K&L Gates LLP

(57) ABSTRACT

A fishing reel includes a spool capable of winding a fishing line, a spool brake that brakes the spool, and a spool braking force controller capable of controlling braking force from the spool brake, wherein the spool braking force controller is configured to have a receiver capable of receiving an instruction from an external device, and to set braking force based on the instruction as to the braking force received by the receiver from the external device.

9 Claims, 7 Drawing Sheets

FISHING REEL, BRAKING FORCE CONTROL SYSTEM AND BRAKING FORCE SETTING DEVICE

TECHNICAL FIELD

This disclosure relates to a fishing reel, a braking force control system including fishing reels and a braking force setting device that can adjust braking force upon casting.

BACKGROUND

Conventionally, when casting objects such as lures, fishing lines, weights, and fishing hooks to a distance using a double-bearing reel, a braking device that brakes a spool is often provided to prevent backlash (line entanglement) upon casting. In such a braking device, the objects can be cast the farthest when the braking force is optimized, but too large a braking force results in a reduction in flying distance, while too small a braking force results in backlash. The braking force may be optimized differently depending on the type of fishing tools used such as the weight of the lure to be cast, air resistance, the type of the fishing line, and the characteristics of the rod and, also, depending on the user's casting method, and weather conditions such as wind. The user needs to adjust the braking force during use by trial and error.

For example as the fishing reel, Japanese Patent Application Publication No. 2007-135417 discloses a spool braking device of a double-bearing reel for braking a spool that is used for casting, and is rotatably attached to a reel body, and to which a fishing line is attached, including a spool braking means provided on the spool and the reel body, and electrically and controllably brakes the spool, a first operation tool movably provided on the reel body and can be moved to a plurality of first operation positions, a second operation tool movably provided on the reel body and can be operated to a plurality of second operation positions, and a spool control means that electrically controls the braking force of the spool braking means according to the first operation position of the first operation tool and the second operation position of the second operation tool.

However, in the configuration according to Japanese Patent Application Publication No. 2007-135417, the braking force is changed by only two operation tools, and there is a problem that it is practically difficult to make more detailed settings of the braking force. Further, if detailed settings are to be made by further increasing the number of operation tools, the fishing reel becomes larger in size and, therefore, it is also problematic to increase the number of operation tools. Moreover, as the user has difficulty accurately grasping the last casting results when searching for the optimum casting conditions, it is problematic to find the optimum casting conditions.

It could therefore be helpful to provide a fishing reel, a braking force control system, and a braking force setting device that can easily make detailed settings of braking force and can accurately control casting conditions.

SUMMARY

I thus provide:

A fishing reel includes a spool capable of winding a fishing line, a spool brake (spool braking unit or spool braking portion) that brakes the spool, and a spool braking force controller (spool braking force controlling unit or spool braking force controlling portion) capable of controlling braking force from the spool brake, wherein the spool braking force controller is configured to have a receiver (receiving unit or receiving portion) capable of receiving an instruction from an external device, and to set braking force based on the instruction as to the braking force received by the receiver from the external device.

The braking force control system may be configured to have an information communication device including the fishing reel described above, a braking force setting portion (braking force setting unit) capable of setting the braking force of a spool, and a transmitter (transmission unit or transmission portion) that transmits information on the set braking force.

The braking force setting device may include a spool brake that brakes the spool, a spool braking force controller capable of controlling braking force from the spool brake, a rotation detector (rotation detecting unit or rotation detecting portion) of the spool, a casting commencement detector (casting commencement detecting unit or casting commencement detecting portion), a calculator (calculating unit or calculating portion) that calculates casting results from a rotation history of the spool after the commencement of casting, and a braking force setting portion capable of setting the braking force of the spool, wherein the braking force setting portion is configured to be capable of displaying the casting results.

A braking force control system or a braking force setting device may be configured so that a spool braking force controller is capable of controlling the time change in braking force, and a braking force setting portion is capable of setting the time change in braking force.

In a braking force control system or a braking force setting device, a spool braking force controller may be configured to be capable of controlling the change of braking force according to the flying distance of a fishing line, and the braking force setting portion is configured to be capable of setting the change of braking force according to the flying distance of the fishing line.

A fishing reel includes a spool capable of winding a fishing line, a spool brake that brakes the spool, a spool braking force controller capable of controlling braking force from the spool brake, and a braking force setting portion capable of setting the braking force of the spool, wherein the spool braking force controller is configured to set the braking force based on a set value of the braking force from the braking force setting portion.

In a braking force setting program, a braking force setting portion capable of setting the braking force of a spool may run on the braking force control system, the braking force setting device or the fishing reel described above.

It is thus possible to provide a fishing reel, a braking force control system and a braking force setting device that can easily make detailed settings of braking force, and can appropriately optimize casting conditions.

DESCRIPTION OF THE NUMERICAL REFERENCES

Figure 1:
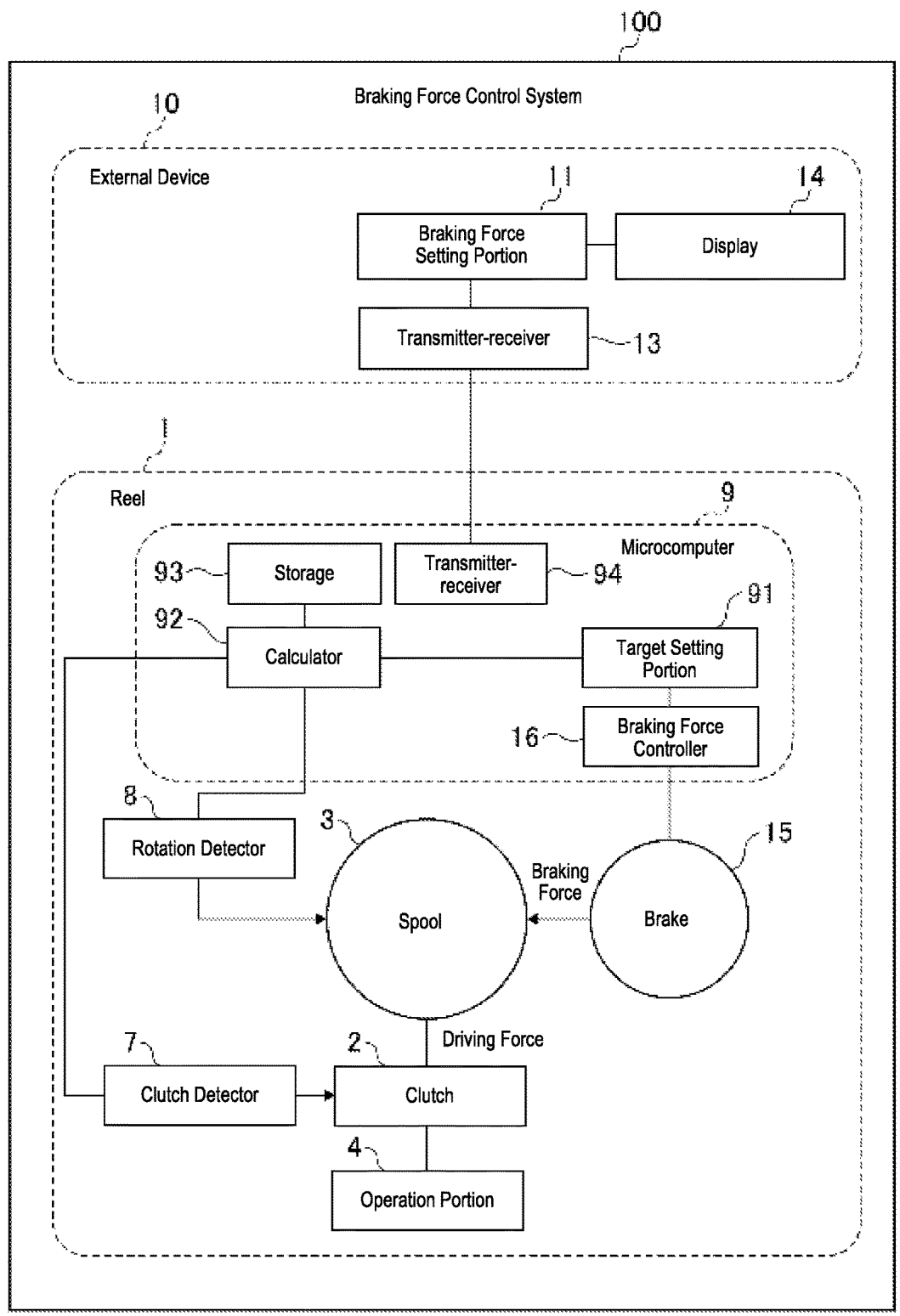
FIG. 1 is a diagram illustrating a braking force control system according to an example.

1 Fishing reel
2 Clutch
3 Spool
4 Operation portion
5 Spool brake
6 Spool braking force controller
8 Rotation detector
9 Microcomputer
10 External device
11 Braking force setting portion
13 Transmitter-receiver (transmitter)
14 Display
15 Braking force brake
16 Braking force controller
20 Second braking force setting portion
51 Eddy current generating plate
52 Fixed magnet
53 Rotating magnet
54 Motor
55 Gear train
56 Magnet position sensor
91 Target setting portion
92 Calculator
93 Storage
100 Braking force control system
101 Braking force setting device

DETAILED DESCRIPTION

Hereinafter, examples will be described in detail with reference to the accompanying drawings. Components common in a plurality of drawings are denoted by the same reference numerals through the plurality of drawings. Each of the drawings is not necessarily scaled for convenience of explanation.

First, a configuration of a fishing reel 1 according to an example will be described with reference to FIG. 1. As illustrated, the fishing reel 1 includes a spool 3 that winds a fishing line, an operation portion (operation unit) 4 that rotates the spool 3, a clutch 2 that switches from being transmissible to non-transmissible and vice versa between the operation portion 4 and the spool 3, a brake (spool brake) 15 that generates braking force to the spool 3, and a braking force controller (spool braking force controller) 16 that adjusts braking force.

Further, as illustrated, the fishing reel 1 includes a clutch detector (clutch detecting unit or clutch detecting portion) 7 that detects the availability of power transmission of a clutch, and a rotation detector 8 that detects the rotation of the spool 3. The clutch detector 7 includes a magnetic sensor and the like, and a detected portion such as a magnet is provided in the movable portion of the clutch 2, thereby detecting a transmissible/non-transmissible state of the clutch 2. The rotation detector 8 can be configured by a combination of a detection means such as a photo interrupter and a means to be detected such as a light shielding plate provided on the spool 3. This allows the rotation of the spool 3 to be converted into an electrical signal. The combination of the detection means and the means to be detected is not limited to the above example, and a known means such as a magnet and a magnetic sensor can be used.

Further, the fishing reel 1 has a microcomputer 9 that processes various signals. The microcomputer 9 is supplied with power from a power source such as a battery (not illustrated), and includes, for example, a target setting portion (target setting unit) 91 that conveys the target braking force to the braking force controller, a calculator (calculation unit or calculation portion) 92 that calculates casting results according to the output of a spool rotation sensor, and a lure information acquiring portion (lure information acquiring unit) 93 that acquires information of a lure 20.

Next, as shown in FIG. 1, an electronic device (also referred to as an external device, external information communication device, external information communication device or the like) 10 includes a braking force setting portion (braking force setting unit) 11 that receives target braking force from the user, a transmitter-receiver (transmitting-receiving unit or transmitting-receiving portion) 13 that transmits and receives set braking force information and casting results, and a display means 14 such as LCD.

Next, each element constituting the fishing reel 1 will be described. The spool 3, which is rotatably supported with respect to the fishing reel 1, can wind a fishing line by forward rotation, and unreel the fishing line wound by backward rotation. The operation portion 4 is configured, for example, as a handle and transmits the rotation operation by the user to the spool 3 through a transmission mechanism such as a gear so that the spool 3 can be rotated forward. Further, the operation portion 4 may be a combination of an operation member such as a lever and a power source such as a motor.

The clutch 2 can switch between the ON state in which power can be transmitted to the spool 3 and the OFF state in which there is no power transmission. In the ON state, the spool 3 can be rotated in the forward direction by an operation member 3 and, in the OFF state, it can be rotated in the forward and backward directions regardless of the state of the operation member 3 (spool-free state).

Next, an example of a procedure for casting and collecting fishing gear such as a lure using a general reel such as the reel will be described with reference to FIGS. 2(a)-2(g).

Figures 2A, 2B, 2C, 2D:
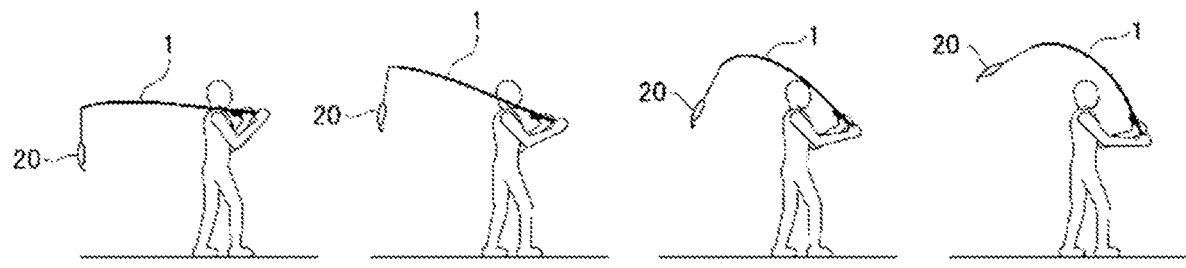
FIGS. 2(*a*)-2(*g*) comprise a diagram illustrating an outline of a casting procedure upon casting according to an example.

First, as shown in FIG. 2(a), the lure 20 is adjusted to a predetermined length from the rod tip by the operation member 3, and the clutch 2 (not illustrated) is turned off to make it a spool-free state. At this time, the spool 3 of the reel 1 is pressed by a thumb so that the fishing line is not reeled out due to the self-weight of the lure 20 or the like.

Next, as shown in FIGS. 2(b) to 2(d), the initial speed is given to the lure 20 by swinging the fishing rod 1. Then, as shown in FIG. 2(e), the lure 20 can be cast when releasing the thumb from the spool 3 at the timing where the lure speed and the unreeling direction become appropriate.

Figures 2E, 2F, 2G:
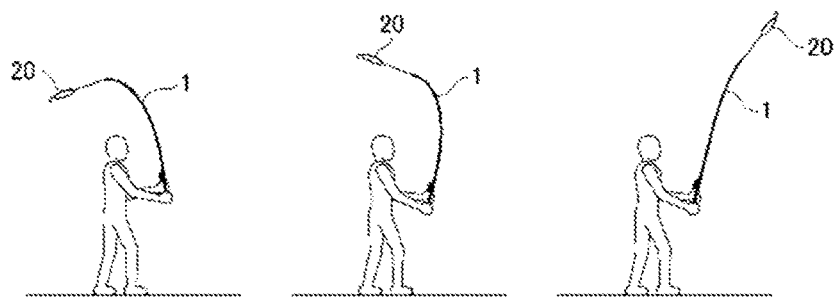

Further, after casting, as shown in FIG. 2(g) and subsequent figures, the lure 20 starts decelerating, receiving tension from the fishing line and air resistance. On the other hand, the spool 3 starts rotating backward due to tension from the fishing line. When the unreeling speed of the fishing line coincides with the flying speed of the lure 20, the spool 3 rotates at a maximum speed, and the fishing line loses tension. The lure 20 continues to decelerate due to air resistance and the like. Then, if the spool 3 continues to rotate at a high speed due to inertia, the unreeling speed of the fishing line exceeds the flying speed of the lure 20. As a result, the fishing line is excessively reeled out, and is entangled in the reel 1. To avoid this, predetermined braking force can be applied to the spool 3 by a braking device 15.

Thereafter, when the lure 20 is sufficiently lowered, it will land on water. At this time, if the braking force from the braking device 5 is too large, the casting distance of the lure 20 is shortened. On the other hand, if the braking force from the braking device 5 is too small, the fishing line is entangled, and the fishing line cannot be wound nor reeled out normally. The desired value of the braking force may vary according to the mass of the lure 20 and air resistance, as well as the length of the rod, casting method, natural environment such as wind, and other various factors. Especially, since the state of the fishing line dynamically changes during casting, making detailed settings is advantageous to obtain desired braking conditions. In addition, grasping detailed casting results makes it easy to control the braking force.

Next, a spool brake 15 will be described. The spool brake 15 is configured by a rotator-shaped eddy current generating plate made of a conductor attached to the spool 3, a fixed magnet disposed to face the eddy current generating plate, a rotating magnet that, along with the fixed magnet, sandwiches the eddy current generating plate from the opposite side of the fixed magnet, a motor that rotates and moves the rotating magnet, a gear train that decelerates, and transmits to a second permanent magnet, the driving of a motor, and a magnet position sensor that detects the position of the permanent magnet (both not illustrated).

The outer peripheral portion of the fixed magnet is divided into six equal parts that are alternately magnetized the N-pole and the S-pole. Further, the inner peripheral portion of the rotating magnet is divided into six equal parts that are alternately magnetized the N-pole and the S-pole. The magnetic field created by the fixed magnet and the rotating magnet penetrates the eddy current generating plate located therebetween (both not illustrated). Therefore, when the spool 3 rotates, an eddy current is generated in the eddy current generating plate, and braking force acts according to the rotation speed.

It is possible to change the magnetic field acting on the eddy current generating plate by rotating the rotating magnet by the motor and the gear train (both not illustrated; the same applies hereinafter). Thus, the braking force can be set to a predetermined amount. That is, when the same poles of the rotating magnet and the fixed magnet are opposed to each other, the magnetic field applied to the eddy current generating plate weakens, and the braking force is diminished. When the different poles of the rotating magnet and the fixed magnet are opposed to each other, the magnetic field applied to the eddy current generating plate strengthens, and the braking force increases.

The magnet position sensor is a sensor that detects the position of the rotating magnet, and includes a known position sensor such as a magnetic sensor and an electric resistance-type sensor.

The braking force controller 16 conducts feedback-control of a motor by passing a necessary current to a motor while monitoring the value of the magnet position sensor so that the predetermined braking force can be applied to the spool 3. Thus, the braking force applied to the spool 3 can be changed over time by the brake 15 and the braking force controller 16.

The eddy current generating plate may be configured by part of the spool 3. Further, the eddy current generating plate may have a predetermined braking force characteristic by relatively moving with respect to the spool 3 by the action of the centrifugal force according to the rotation speed of the spool 3.

Further, the above-described brake 15 is not limited to the method using an eddy current as descried above, and the same effect can be obtained as long as the braking force can be adjusted by a microcomputer over time. Other methods of the braking device are not limited to specific methods, and include a method of generating regenerative brake between a permanent magnet attached to the spool and a coil provided in the reel body, and a method of using a contact brake that changes the contact force to a friction plate attached to the spool by an electromagnetic actuator or the like.

The fishing reel 1 includes the spool 3 capable of winding a fishing line, the spool brake 15 that brakes the spool 3, and the spool braking force controller 16 capable of controlling braking force from the spool brake 15, wherein the spool braking force controller 16 is configured to have a receiver (transmitter-receiver) 94 capable of receiving an instruction from an external device, and to set braking force based on the instruction as to the braking force received by the receiver 94 from the external device 10.

The fishing reel 1 makes it possible to easily make more detailed settings of braking force, and accurately control casting conditions.

A braking force control system 100 is configured to include an information communication device 10 having the above-described fishing reel 1, a braking force setting portion 11 capable of setting the braking force of the spool, and a transmitter 13 that transmits information on the set braking force.

The braking force control system 100 makes it possible to easily make more detailed settings of braking force from the outside, and accurately control casting conditions.

A braking force setting device includes the spool brake 15 that brakes the spool, the spool braking force controller 16 capable of controlling braking force from the spool brake 15, the rotation detector 8 of the spool, a casting commencement detector (not illustrated), a calculator 92 that calculates casting results from a rotation history of the spool following the commencement of casting, and the braking force setting portion 11 capable of setting the braking force of the spool, wherein the braking force setting portion 11 is configured to be capable of displaying casting results. In the example in FIG. 1, the braking force setting portion 11 is provided in the external device 10, but it may be alternatively provided in the fishing reel 1. In this configuration, the braking force setting device can be incorporated into the fishing reel 1. In this manner, a function for setting braking force can be easily added to a fishing reel.

The braking force setting device can provide a fishing reel, a braking force control system and a braking force setting device that can easily make more detailed settings of braking force, and accurately control casting conditions.

In the braking force control system 100 or the braking force setting device, the spool braking force controller 16 and the braking force setting portion are configured to be capable of controlling the time change in braking force, and of setting the time change in braking force, respectively.

In the braking force control system 100 or the braking force setting device, a spool braking force controller and the braking force setting portion are configured to be capable of controlling a change in braking force according to the flying distance of a fishing line, and setting a change in braking force according to the flying distance of the fishing line, respectively.

The fishing reel 1 includes the spool 3 capable of winding a fishing line, the spool brake 15 that brakes the spool 3, the spool braking force controller 16 capable of controlling braking force from the spool brake 15, and the braking force setting portion 11 capable of setting the braking force of the spool, wherein the spool braking force controller 16 is configured to set the braking force based on a set value of the braking force from the braking force setting portion 11. This makes it possible to provide the braking force setting portion 11 shown in FIG. 1 in the fishing reel 1.

As described above, the braking force controller 16 sets braking force by the braking force setting portion 11 executed on an electronic device 10. The electronic device 10 can include, but is not limited to, a smart phone, a wearable terminal such as a smart glasses or smart watch, and a personal computer.

Figure 3:
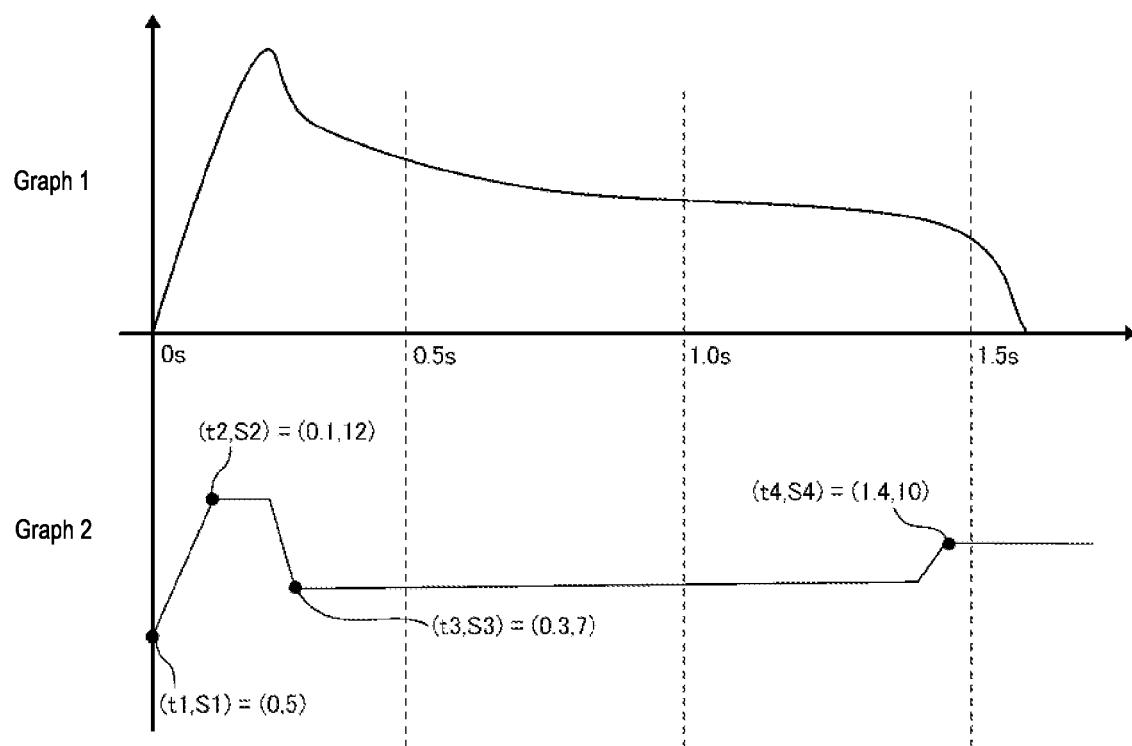
FIG. 3 is a diagram illustrating an example of a screen for setting braking force in a braking force control system and the like according to an example.

Next, an example of a screen that sets braking force will be described with reference to FIG. 3. Graph 1 in the figure shows past (last) casting results with the horizontal axis indicating the time elapsed from the commencement of casting, and the vertical axis indicating the rotation speed of the spool 3. On the other hand, Graph 2 in the figure shows the settings of braking force with the horizontal axis indicating the time elapsed from the commencement of casting as with Graph 1, and the vertical axis indicating set values of braking force. The axial direction is defined so that the braking force becomes higher upward.

The user can set the time change in braking force while viewing the casting results in Graph 1. For example, n elapsed time (t1 to tn) from the commencement of casting and the respective brake settings (S1 to Sn) are input. In the example shown in FIG. 3, the set brake value is defined by four combinations of time and braking force.

When the values are transmitted to the fishing reel 1 by a transmission means 13, the braking force controller 16 adjusts the braking force to the spool 3 over time in accordance with the set values. Incidentally, there is a limit to the changing speed of the set brake value, and the value is determined by the characteristics of the brake 5. As shown in Graph 2 in FIG. 3, the setting of the brake is changed before the tn in accordance with the amount of the change. Thus, it is possible to set complicated braking force conditions without providing an input portion (input unit) and a display (display unit or display portion) on the side of the fishing reel 1.

Further, there is an advantage that braking force conditions can be easily controlled by allowing the braking force conditions for the next casting to be set while displaying the past (especially, the last) casting results. This will be explained with reference to FIGS. 4 and 5.

Figure 4:
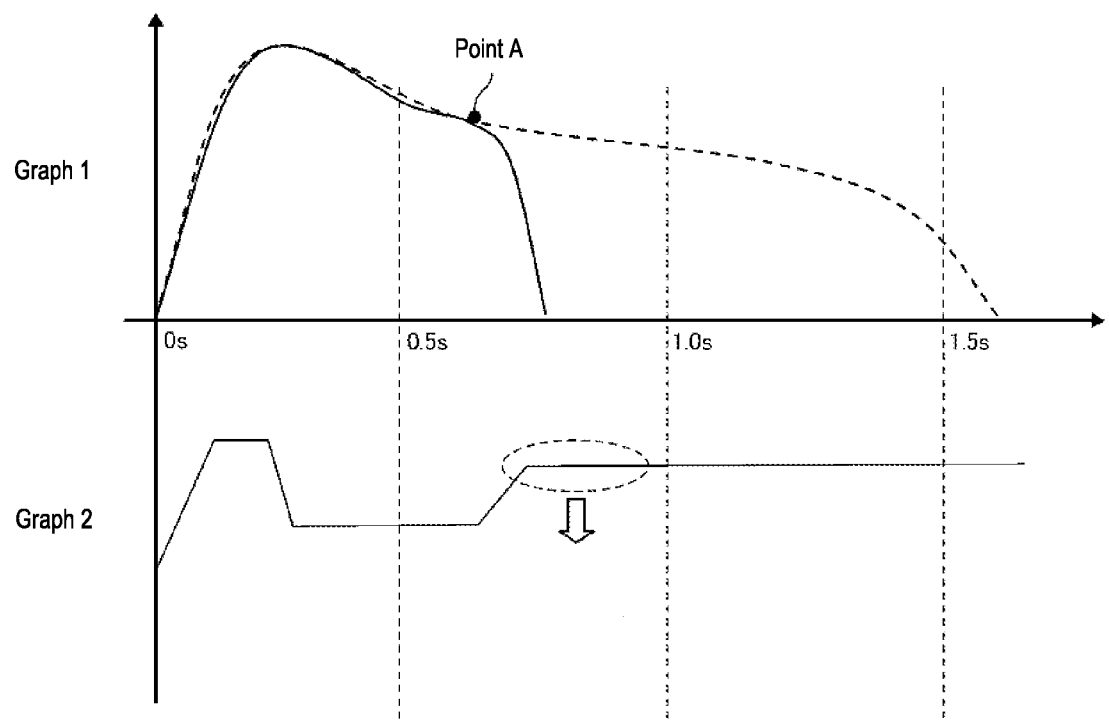
FIG. 4 is a diagram illustrating an example of a screen for setting braking force in a braking force control system and the like according to an example.

FIG. 4 shows the casting results when the braking force was too large and the flying distance did not increase, as well as the braking conditions at that time. Graph 1 in the figure indicates the rotation speed of the spool 3, with the solid line being the last casting results, and the dotted line being ideal casting results. In the ideal casting results shown by a dotted line, a long flying distance is obtained with a gradual decrease in the speed. On the other hand, in the last casting results indicated by a solid line, a long flying distance was unable to be obtained as a result of a rapid speed reduction due to too strong braking force at point A. In such a configuration, it is possible to set more ideal braking force by weakening the braking force at point A.

In this manner, ideal casting results and the last casting results may be displayed at once. This makes it easier to understand how to set the brake to increase the flying distance. The ideal casting results may be the one with reference to past data when the maximum distance was achieved under similar conditions, or may be stored in advance, for example, when shipped from factory and be selected from among similar conditions.

Figure 5:
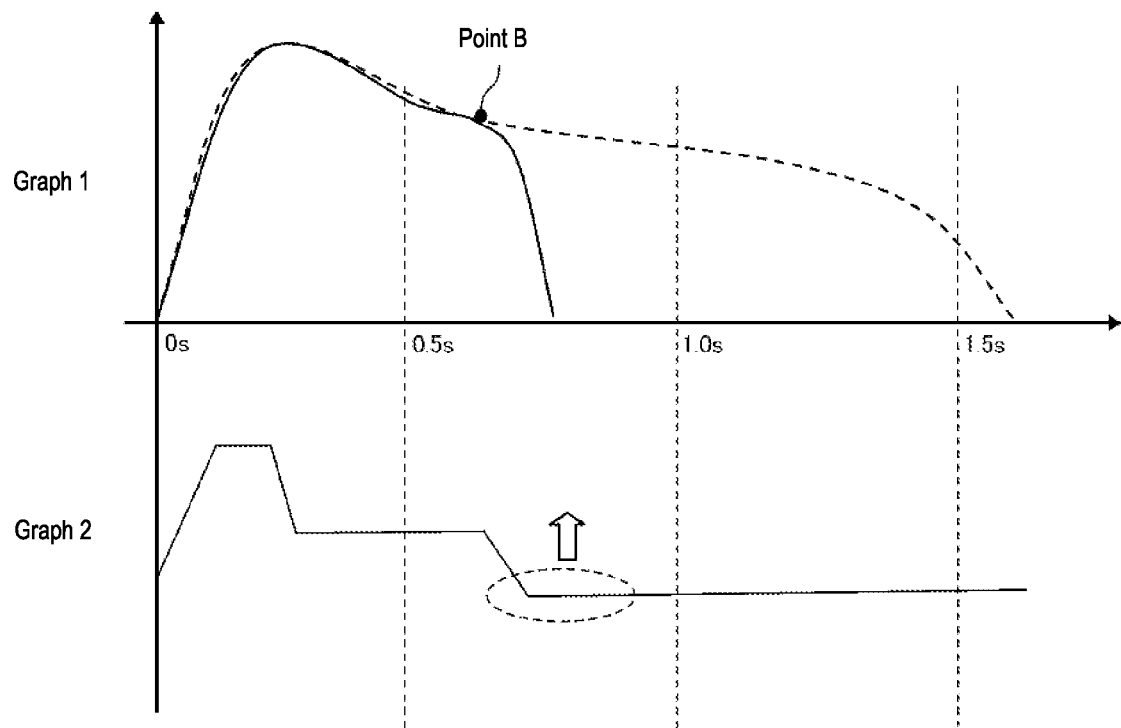
FIG. 5 is a diagram illustrating an example of a screen for setting braking force in a braking force control system and the like according to an example.

Next, FIG. 5 shows casting results when the braking force was so small that a line was entangled, as well as the braking conditions of that time. The braking force was too weak at point B so that the unreeling speed of the line exceeded the speed of the lure, which caused the entanglement of the line. As a result, the line was unable to be reeled out from the spool 3, which caused a sudden deceleration. In such a configuration, more ideal braking force can be set by increasing the braking force at point B (after unraveling the entanglement in the line).

Whether the braking force is excessively large or small can be judged not only on Graph 1 but also on the state of the entangled line after casting. A skilled user can foresee the occurrence of line entanglement by feeling the slack in the line with a finger. However, it is difficult to accurately grasp the timing. As described above, it is possible to accurately grasp the timing of the occurrence of line entanglement by displaying the casting results measured by the fishing reel 1, which makes it easier to set more appropriate braking conditions upon subsequent castings.

Figure 6:
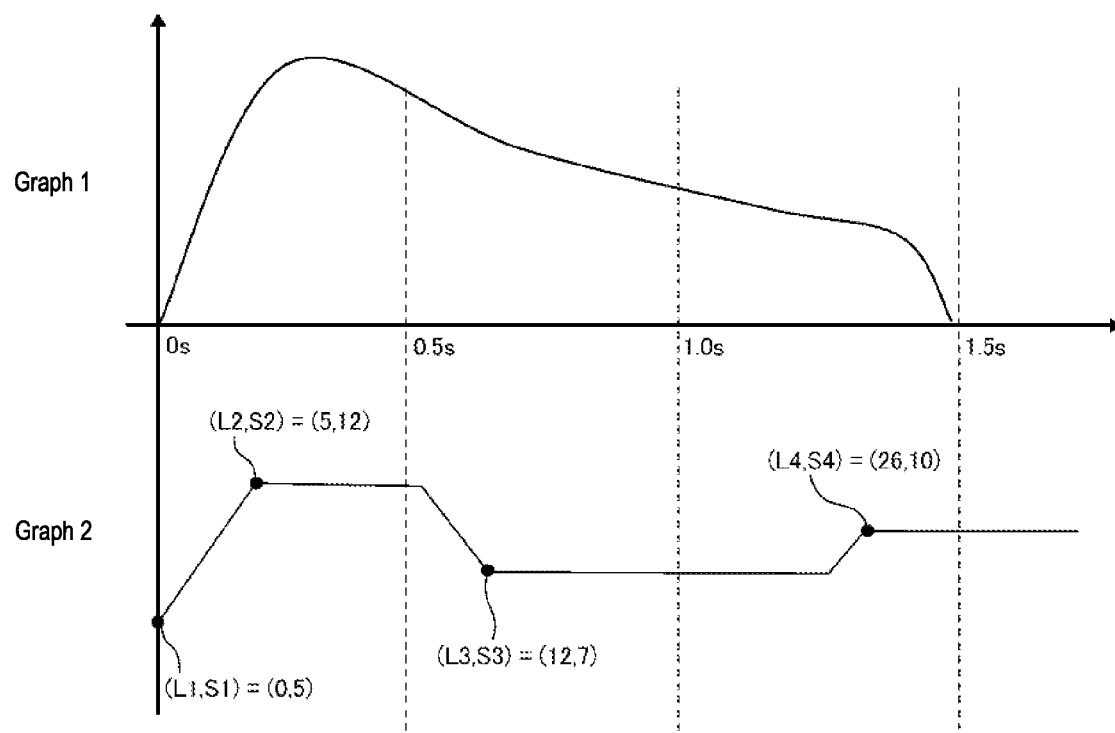
FIG. 6 is a diagram illustrating an example of a screen for setting braking force in a braking force control system and the like according to an example.

Next, another example of a screen for setting braking force will be described with reference to FIG. 6. Graph 1 in the figure shows past (last) casting results with the horizontal axis indicating the unreeled distance after the commencement of casting, and the vertical axis indicating the rotation speed of the spool 3. On the other hand, Graph 2 in the figure shows the setting of braking force with the horizontal axis indicating the unreeling time after the commencement of casting as with Graph 1, and the vertical axis indicating set values of braking force. The axial direction is defined so that the braking force becomes higher upward. The user sets the time change in braking force while viewing the casting results in Graph 1.

In this example, the user inputs n unreeled distances (L1-Ln) after the commencement of casting, and the respective brake settings (S1-Sn). When the values are transmitted to the fishing reel 1 by the transmitter 13, the braking force controller 16 adjusts the braking force to the spool 3 in accordance with the set values. That is, when the specified flying distance is obtained, the braking force is adjusted to the set value of that time.

Thus, the brake setting state can be switched in turn according to the unreeled distance after the commencement of casting. Thus, for example, when you want to apply a brake before an obstacle, if any, in the casting direction, it is possible to increase the braking force before running into the obstacle. Further, air resistance received by a fishing line changes in accordance with the length of the unreeled fishing line. Such an effect can be corrected by changing the brake settings according to the unreeled distance after the commencement of casting as described above.

Figure 7:
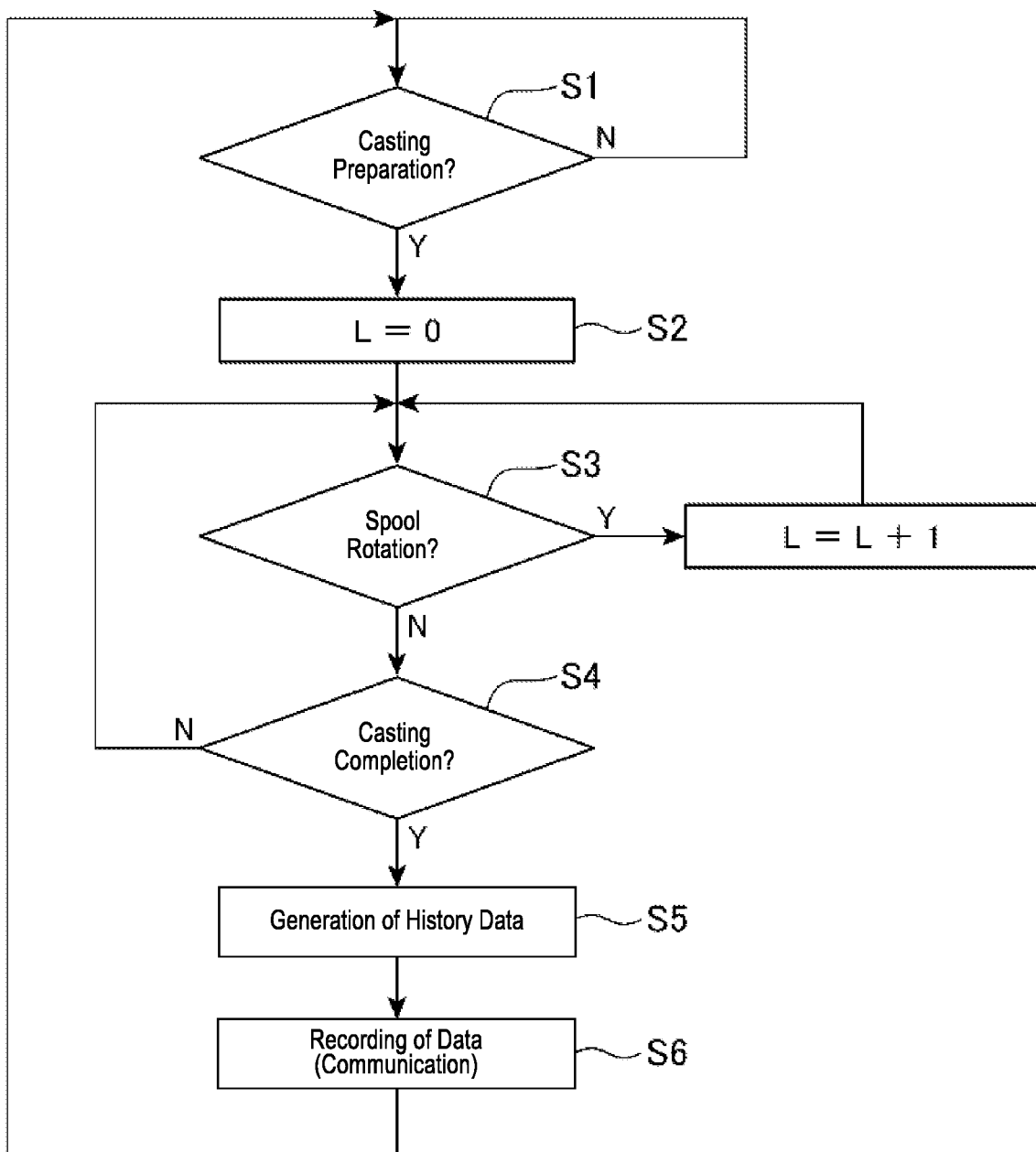
FIG. 7 is a diagram illustrating an operation flow of displaying casting results in a braking force control system and the like according to an example.
Figure 8:
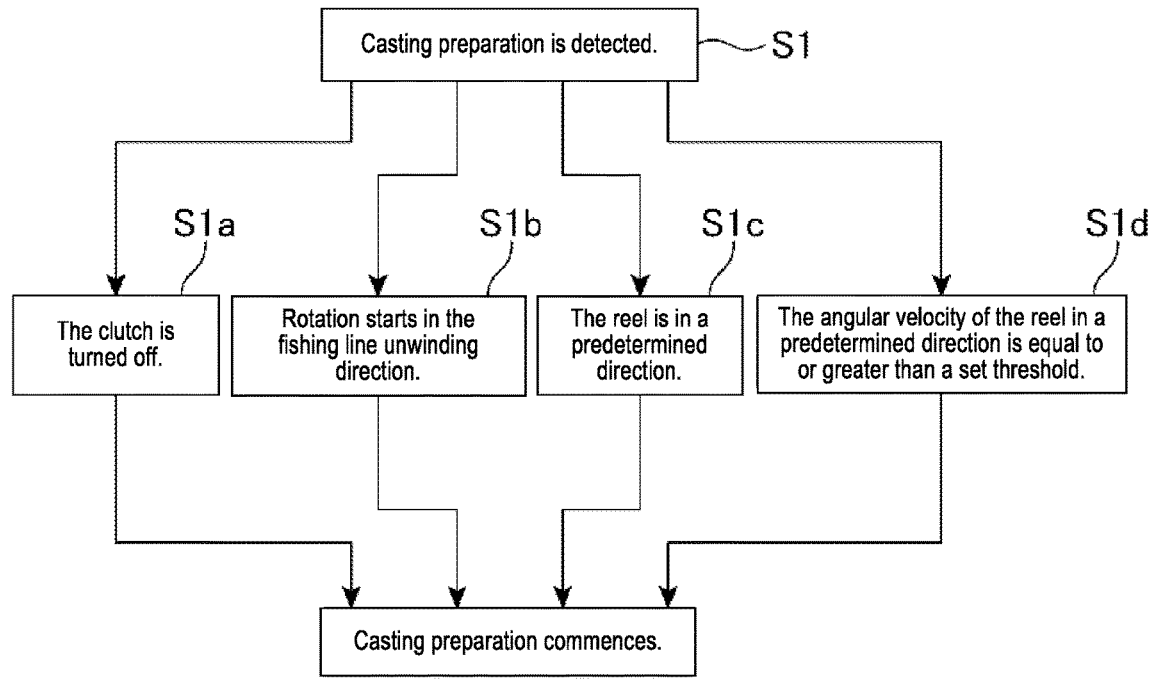
FIG. 8 is a diagram illustrating an operation flow of displaying casting results in a braking force control system and the like according to an example.
Figure 9:
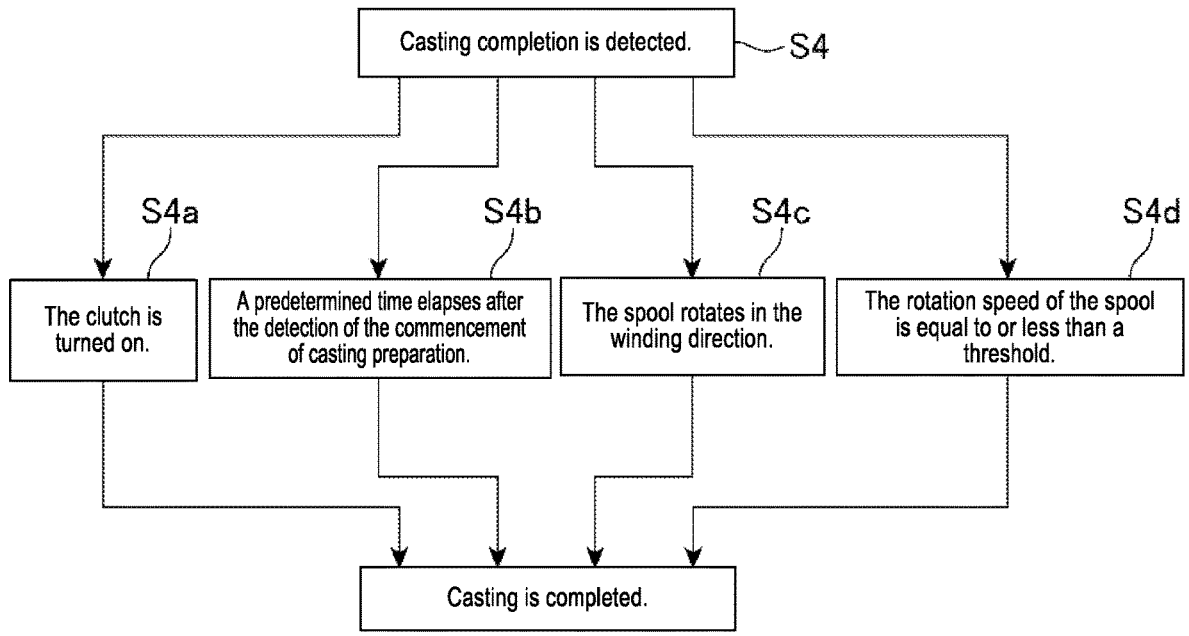
FIG. 9 is a diagram illustrating an operation flow of displaying casting results in a braking force control system and the like according to an example.

Next, an operation flow that indicates casting results will be described with reference to FIGS. 7 to 9. As shown in FIG. 7, first, in step S1, a casting preparation commencement detector (casting preparation commencement detecting unit or casting preparation commencement detecting portion) that detects casting preparation detects whether the fishing reel 1 has commenced casting preparation. If the casting preparation has yet to be commenced, the process returns to step S1.

When the casting preparation has been commenced, the process moves on to step S2. In step S2, detection by the rotation detector 8 that detects the rotation of the spool 3 begins, and the distance is reset (L=0).

Next, in step S3, a rotation detector that detects the rotation of the spool 3 confirms whether or not the rotation of the spool is detected. If the rotation is detected, the measured value is increased by a predetermined distance (L=L+1), and then the process returns to step S3. A distance L may be a rotation amount of the spool 3 or an amount of unreeled fishing line obtained by correcting the radius change of the spool 3.

In step S3, when the rotation of the spool 3 is not detected by the rotation detector 8 that detects the rotation of the spool, the process moves on to the next step. In step S4, a casting completion detector (casting completion detecting unit or casting completion detecting portion) 7 that detects the completion of casting detects whether or not the casting is completed. If casting preparation has yet to be commenced, the process returns to step S3.

When the casting is completed, the process moves on to step S5. In step S5, history data is generated by a history data generator (history data generating unit or history data generating portion) 8 that generates history data from the preparation to the completion of casting, and the process moves on to the next step.

In step S6, the history data generated in step S5 is stored in a storage (storing unit or storing portion) 9, or transmitted to the outside by a communication processor (communication processing unit or communication processing portion) described later. This allows the transmission of information to an external device such as a PC, smart phone and other reel, as well as the inspection and recording of data.

Here, history data will be described. The history data may be, for example, a change of the distance L for each predetermined time, or may be only the final flying distance L. It may also include the change of speed of the spool obtained by time differentiation of L, the time change in the braking force, a maximum speed of the fishing line, and a maximum rotation speed of the spool. Further, daily casting history may be recorded by totaling the number of times of casting on that day, or the total casting data of the reel may also be recorded.

Next, a state at the time of the commencement of casting preparation of the fishing reel 1 will be described with reference to FIG. 8. In the fishing reel 1, a casting preparation commencement detector 6 is configured to detect the commencement of casting preparation in the above mentioned step S1, more specifically, when the clutch 2 is turned off (S1$a$), when the spool 3 starts rotating in a fishing line unreeling direction from a standstill (S1$b$), when the reel is in a predetermined direction (S1$c$), when the angular velocity of the reel in a predetermined direction is equal to or greater than a set threshold (S1$d$), or when an input device such as a button is provided on the reel, and the user operates the input device when he/she wants to commence casting preparation (S1$e$). As described above, the casting preparation commencement detector 6 can accurately detect the commencement of casting preparation by detecting any one of the above states.

Next, a state at the time of the completion of casting of the fishing reel 1 will be described with reference to FIG. 9. In the fishing reel 1, a casting completion detector 7 is configured to detect the completion of casting when the clutch 2 is turned on (S4$a$), when a predetermined time elapses after the detection of the commencement of casting preparation (S4$b$), when the rotation of the spool 3 is in a winding direction (S4$c$), when the rotation speed of the spool is equal to or less than a threshold (S4$d$), or when an input device such as a button is provided on the reel, and the user operates the input device when judging that casting is completed (S4$e$). As described above, the casting completion detector 7 can accurately detect the completion of casting by detecting any one of the above states.

Figure 10:
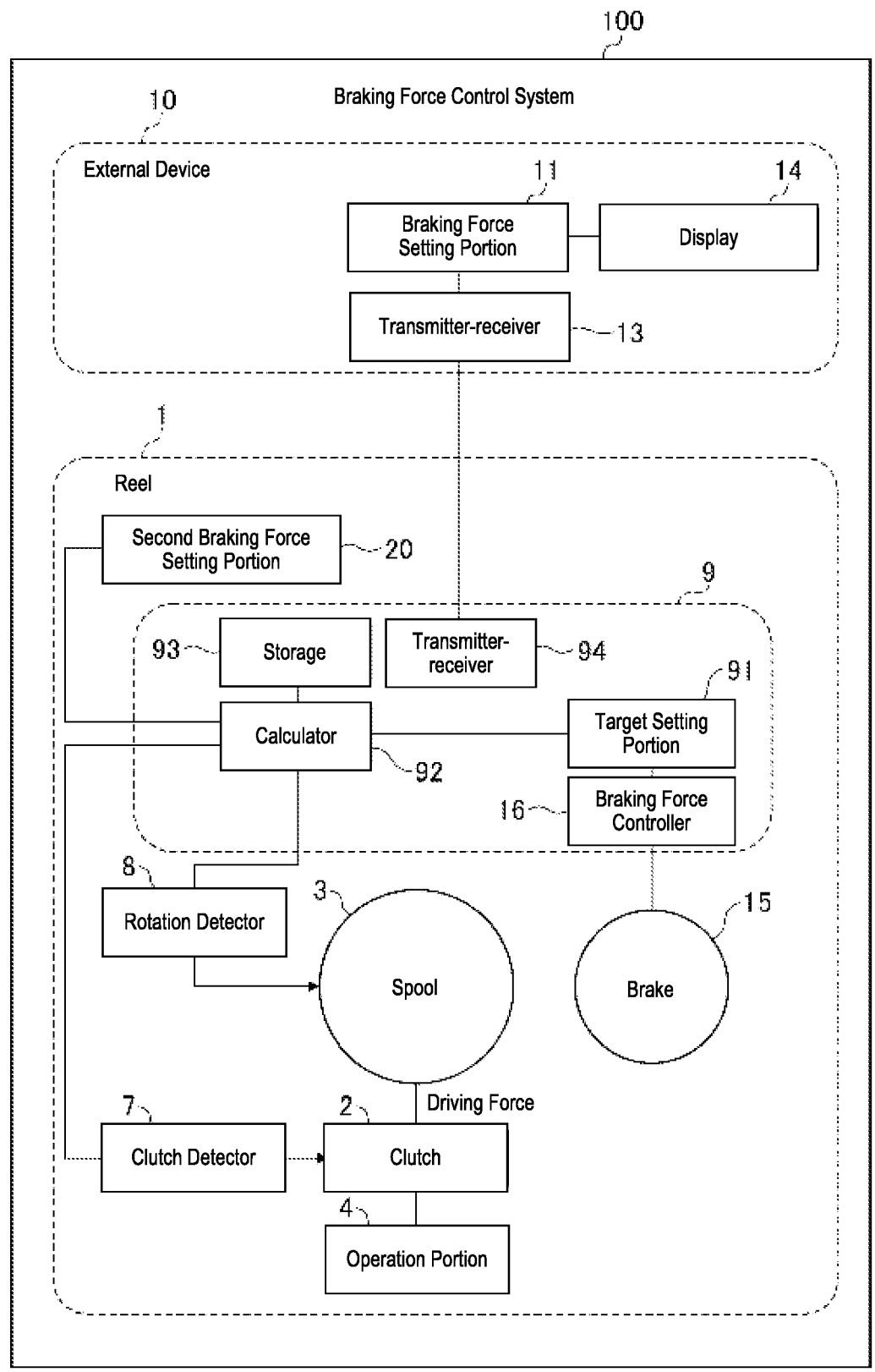
FIG. 10 is a diagram illustrating a braking force control system according to another example.

Next, another example will be described with reference to FIG. 10. The fishing reel 1 has a second braking force setting portion 20. The rest is the same as in the above-described examples. The second braking force setting portion 20 includes, for example, two membrane switches, one of which is a + button (plus button) and the other of which is a − button (minus button). The method of realizing the second braking force setting portion 20 is not limited to the above, and a known means that can be attached to the reel body and that allows the user to perform the following operations can be used.

As described above, it is possible to finely adjust the braking force using the second braking force setting portion 20 after setting the braking force using the external device 10. This allows fine settings of braking force without bringing up the external device 10 to set the braking force.

One example of the methods is to offset the braking force set by the external device 10 or the factory default setting of braking force using the second braking force setting portion 20. For example, assuming that the braking force is set by the external device 10 to:

(t1, t2, t3)=(0, 100, 500) (S1, S2, S3)=(5, 12, 10), the set values are incremented by 1 as (S1, S2, S3)=(6, 13, 11) when pressing the + button, and are decremented by 1 as (S1, S2, S3)=(4, 11, 9) when pressing the − button. This allows fine adjustments by the second braking force setting portion 20 after making fine settings using the external device 10.

Another example of the methods is to prepare a plurality of sets of set values of braking force in advance using the external device 10, and to make a selection from said plurality of sets using the second setting means. For example, assuming that the following settings are made:

Pattern 1: (t1, t2, t3)=(0, 100, 500) (S1, S2, S3)=(5, 12, 10)

Pattern 2: (t1, t2, t3)=(0, 100, 600) (S1, S2, S3)=(4, 12, 10)

Pattern 3: (t1, t2, t3)=(0, 100, 700) (S1, S2, S3)=(3, 12, 10)

Pattern 4: (t1, t2, t3)=(0, 100, 800) (S1, S2, S3)=(10, 15, 8)

and that the Pattern 2 is currently used, the Pattern 3 is used when pressing the + button, and the Pattern 1 is used when pressing the − button. This allows fine adjustments to the set values of the brake by manual manipulation only using the second braking force setting means.

The dimension, material and arrangement of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing reel comprising:
a spool configured to wind a fishing line;
a spool brake configured to brake the spool; and
a spool braking force controller configured to control braking force from the spool brake,
wherein the spool braking force controller comprises a receiver configured to receive an instruction from an external device, and wherein the spool braking force controller is configured to set the braking force based on the instruction as to the braking force received by the receiver from the external device,
wherein the spool braking force controller is configured to control a change in braking force according to a flying distance of the fishing line, and a braking force setting portion is configured to set the change in braking force according to the flying distance of the fishing line.

2. A braking force control system comprising:
an information communication device that includes the fishing reel according to claim 1, the braking force setting portion configured to set the braking force of the spool, and
a transmitter configured to transmit information on the set braking force.

3. The braking force control system according to claim 2, wherein the spool braking force controller is configured to control a time change in braking force, and the braking force setting portion is configured to set the time change in braking force.

4. A braking force setting program comprising instructions that, when executed by the braking force setting portion of claim 2, causes the braking force setting portion to set the braking force of the spool, wherein the braking force setting portion is configured to run on the braking force control system according to claim 2.

5. A braking force setting device comprising:
a spool brake configured to brake a spool,
a spool braking force controller configured to control braking force from the spool brake,
a rotation detector of the spool,
a casting commencement detector,
a calculator configured to calculate casting results from a rotation history of the spool after commencement of casting, and
a braking force setting portion configured to set the braking force of the spool,
wherein the braking force setting portion is configured to display the casting results,
wherein the spool braking force controller is configured to control a change in braking force according to a flying distance of a fishing line, and the braking force setting portion is configured to set the change in braking force according to the flying distance of the fishing line.

6. The braking force setting device according to claim 5, wherein the spool braking force controller is configured to control a time change in braking force, and the braking force setting portion is capable of setting the time change in braking force.

7. A braking force setting program comprising instructions that, when executed by the braking force setting portion of claim 5, causes the braking force setting portion to set the braking force of the spool, wherein the braking force setting portion is configured to run on the braking force setting device according to claim 5.

8. A fishing reel comprising:
a spool configured to wind a fishing line;
a spool brake configured to brake the spool;
a spool braking force controller configured to control braking force from the spool brake, and
a braking force setting portion configured to set the braking force of the spool,
wherein the spool braking force controller is configured to set the braking force based on a set value from the braking force setting portion,
wherein the spool braking force controller is configured to control a change in braking force according to a flying distance of the fishing line, and the braking force setting portion is configured to set the change in braking force according to the flying distance of the fishing line.

9. A braking force setting program comprising instructions that, when executed by the braking force setting portion of claim 8, causes the braking force setting portion to set the braking force of the spool, wherein the braking force setting portion is configured to run on the fishing reel according to claim 8.

* * * * *